Patented Jan. 21, 1936

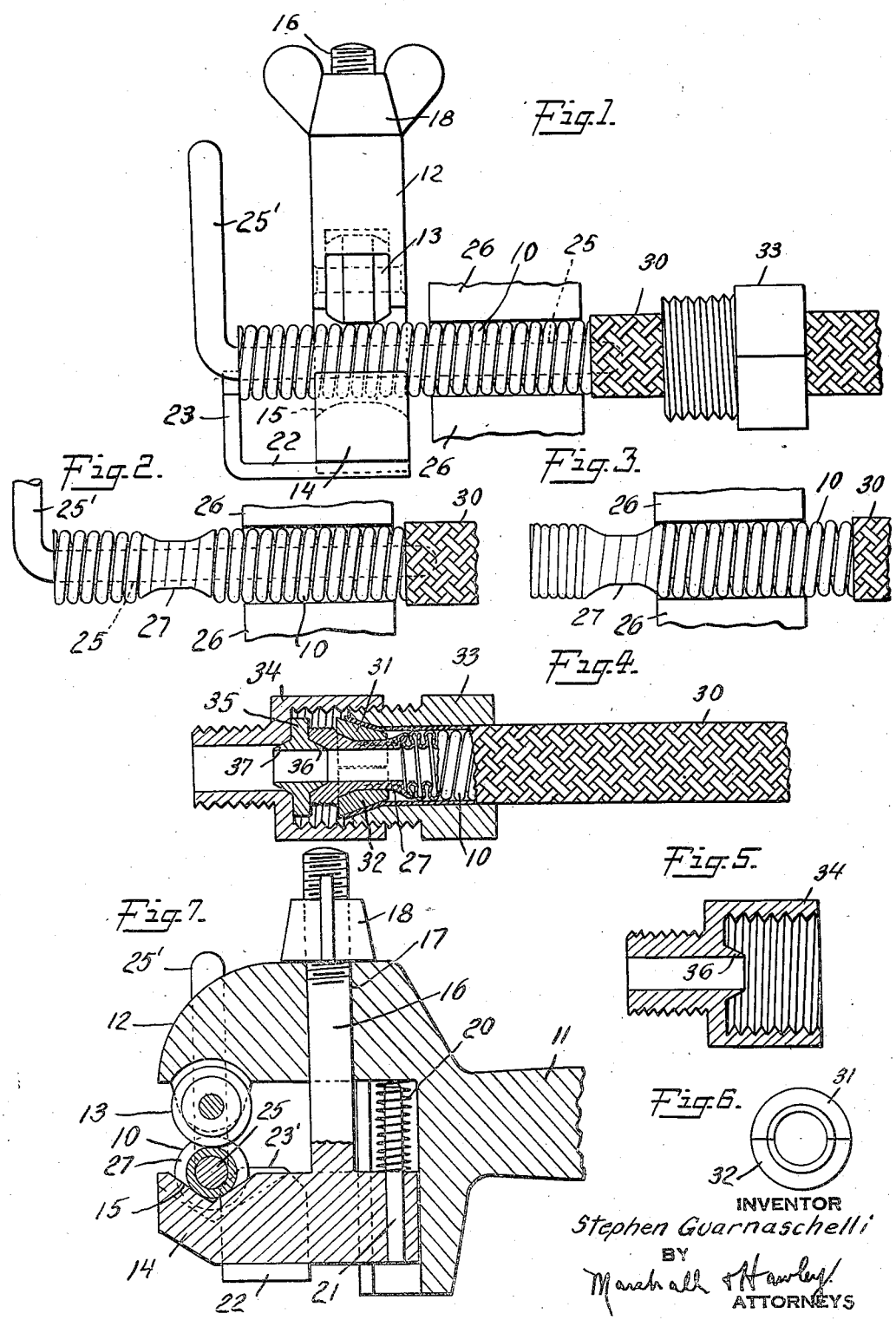

2,028,600

UNITED STATES PATENT OFFICE 2,028,600

FLEXIBLE TUBING

Stephen Guarnaschelli, Brooklyn, N. Y., assignor to Packless Metal Products Corporation, New York, N. Y., a corporation of Delaware Application April 30, 1934, Serial No. 723,088

3 Claims. (Cl. 285—72)

This invention relates to flexible tubing and particularly to seamless metallic, preferably spirally corrugated tubing and to fixtures or couplings for joining sections of such tubing and for securing a flexible sheath thereto.

The sale and use of flexible metallic tubing has been limited by the fact that it has been practically impossible to join or splice tubing in the field in case of a break. This has required the user to replace the whole length broken or to employ an expert mechanic or service man to make and seal the joint.

This invention has for its salient object to provide means for securing a flexible sheath of metal or other suitable material to a metallic tubing of the character specified, that is simple and practical in construction and can be easily applied.

Another object of the invention is to provide a leak-proof coupling for joining together pipe sections of the character specified without soldering or brazing the joint.

Another object of the invention is to provide simple, practical and effective means for reducing the outside diameter of or grooving a corrugated metal tube.

Another object of the invention is to provide simple, practical and effective means for forming a conical seat in the end of a corrugated metal tube.

Another object of the invention is to provide means constructed and arranged to simultaneously secure a sheath to a corrugated metal tube and form a leak-proof solderless joint on the end of the tube.

Further objects of the invention will appear from the following specification taken in connection with the drawing which forms a part of this application, and in which Fig. 1 is an elevational view showing a corrugated metal tube and means for grooving or reducing the outside diameter of the tube at a point spaced from the end thereof;

Fig. 2 is an elevational view showing the tube with a groove formed therein;

Fig. 3 is a view similar to Fig. 2 but illustrating the corrugations at the end beyond the groove compressed longitudinally of the tube;

Fig. 4 is a sectional elevation showing the coupling on the end of the tube and the sheath secured to the tube;

Fig. 5 is a sectional elevation showing a slightly different form of coupling;

Fig. 6 is an elevational view showing the split collar which seats in the groove formed in the corrugated tube; and Fig. 7 is a sectional elevation of the grooving tool.

In carrying out the invention the corrugated metal tubing is first provided with a groove spaced from the end thereof and the corrugations beyond the groove or at the end of the tube are compressed longitudinally of the tube. A sheath and coupling member are placed around the tube and a collar, preferably a split collar, is placed in the groove and thereafter the sheath is pushed longitudinally on the tube over the split collar. A second coupling member is threaded onto the first member and is provided with a conical seat therein which is forced by the relative movement of the coupling members against the outer end of the tube and forms a conical seat therein. The coaction between the coupling members also clamps the sheath to the collar and secures the collar in fixed position in the groove.

In order to insure the proper spacing of the groove, from the end of the tube and to prevent undue compression of the corrugations in forming the groove a special tool is provided. This tool comprises a fixed and a movable member, one of these members having a roller and the other having a curved portion disposed opposite the roller. The tool is also provided with a stop which engages the outer end of the corrugated tube and positions the tool in proper spaced relation from the tube end. The tool is rotated on the tube and a movable member is gradually moved toward the other member, a stop being provided to limit this movement so that the proper depth of groove will be formed.

Further details of the invention will appear from the following description.

In the particular embodiment of the invention illustrated in the drawing there is shown a corrugated metal tube 10 which may or may not be formed with spiral corrugations.

In Fig. 7 there is shown a tool comprising a handle 11, a fixed jaw 12 having a roller 13 mounted therein and a movable jaw 14 having a curved abutment 15 disposed opposite the roller 13. The movable jaw 14 has a shank 16 which is slidably mounted in an opening 17 formed in the jaw 12 and is threaded at its outer end and has a wing nut 18 mounted thereon. The jaw 14 is normally urged away from the jaw 12 by a spring 20 which is mounted on a pin 21 carried by the jaw 14. The pin forms a stop for limiting the movement of the jaw 14 toward the jaw 12.

The jaw 12 has connected thereto an angle bar 22, the outer end 23 of which is adapted to seat against the end of the tube 10.

The tool is shown in Fig. 1 in the proper position to begin the grooving operation. A rod 25 having an arm 25′ in the outer end thereof is positioned in the tube to prevent the grooving operation from decreasing the internal diameter of the tube. When the tool is positioned, as shown in Fig. 1, the wing nut 18 is turned to draw the jaw 14 toward the jaw 12 and the tool is rotated on the tube which is held in any suitable manner as in vice jaws 26, 26. The rotation of the tool and the gradual turning of the nut 18 will cause an annular depression or groove 27 to be formed on the tube.

After the groove has been formed the end of the tube beyond the groove is compressed longitudinally to the form shown in Fig. 3.

A flexible sheath 30 is placed on the tube and a split collar comprising sections 31 and 32 is placed in the groove 27. The sheath is then pushed over the collar and a coupling member 33 is pushed over the sheath and tube, as shown in Fig. 4. A second coupling member 34 is then threaded on the coupling member 33 and there is mounted in the coupling member 34 a collar 35 having oppositely extending conical projections 36 and 37. As the coupling member 34 is screwed on the coupling member 33 the conical projection 36 would be forced into the compressed end of the tube and will further compress the end, as shown in Fig. 4, forming a conical seat in the end of the tube. If desired, the conical projection 36 may be formed directly on the coupling member 34 dispensing with the collar 35.

It will be evident from the above description that the coaction between the coupling members 33 and 34 will simultaneously secure the sheath 30 in position on the tube and also form a leak-proof joint between the projection 36 and the end of the corrugated tube. It will also be obvious that the coupling members can be used to form the leak-proof joint at the end of the tube without using or securing the flexible sheath to the tube.

From the foregoing description it will be evident that simple, practical and effective means have been provided for securing a leak-proof coupling to the end of a flexible corrugated tube and at the same time securing the protecting sheath around the tube. The means described can obviously be applied in the field and by the use of the device a broken tube can be easily and quickly repaired and coupled.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a corrugated metallic tube having an annular groove adjacent its end formed by deforming the corrugations in the tube, a collar seated in the groove and having a tapered outer surface, a coupling member clamping the collar to the tube, and means coacting with the coupling member in the clamping operation and arranged to compress the end of the tube beyond said annular groove into a substantially solid mass and form a conical seat in the end of the tube.

2. In combination, a corrugated metallic tube having an annular groove adjacent its end formed by deforming the corrugations in the tube, a collar seated in the groove and having a tapered outer surface, a coupling member having a tapered inner surface engaging and clamping the collar to the tube, and means coacting with the coupling member in the clamping operation and arranged to compress the end of the tube beyond said annular groove into a substantially solid mass and form a conical seat in the end of the tube.

3. In combination, a corrugated, metallic tube having adjacent the end, a reduced grooved portion formed by deforming the corrugations therein, a split collar seated in the groove, a coupling member surrounding the tube and engaging and abutting against said collar, a second coupling member engaging and coacting with said first coupling member and surrounding the end of the tube, and means within said second coupling member having a conical seat and arranged when the coupling members are moved toward each other to compress the end of the tube into a substantially solid mass and to form a conical seal between the tube and said conical seat.

STEPHEN GUARNASCHELLI.